Figure 1:
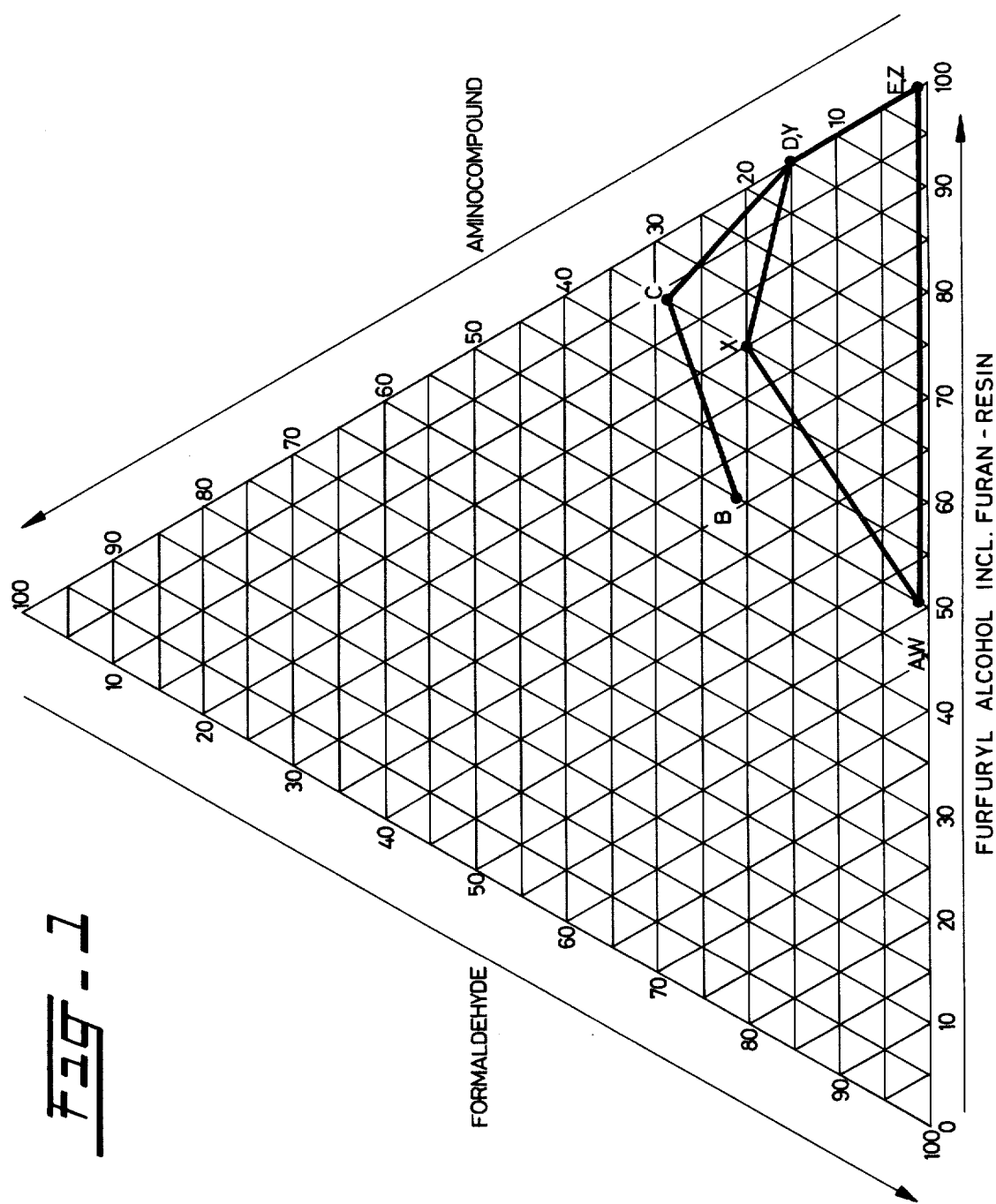

United States Patent [19]
Larsen et al.

[11] 3,919,127
[45] Nov. 11, 1975

[54] POLYFURAN FOAMS AND A METHOD OF PREPARING SAME

[75] Inventors: Hans-Ole Larsen, Hvidovre; Sven Barfoed, Copenhagen, both of Denmark; John Arthur Gooch Gent, Liphook, England

[73] Assignee: Wolff & Kaaber, Farum, Denmark

[22] Filed: Aug. 14, 1973

[21] Appl. No.: 388,168

[30] Foreign Application Priority Data
Aug. 25, 1972 United Kingdom............ 39707/72

[52] U.S. Cl.............. 260/2.5 F; 260/15; 260/17.5; 260/39 R; 260/70 A; 260/829
[51] Int. Cl.²................ C08J 9/14; C08J 9/08
[58] Field of Search............ 260/70 A, 2.5 F, 829

[56] References Cited
UNITED STATES PATENTS

| | | |
|---|---|---|
| 3,222,315 | 12/1965 | Singer............ 260/70 A |
| 3,360,492 | 12/1967 | Tsou............ 260/70 A |
| 3,390,107 | 6/1968 | Tashlick et al............ 260/2.5 F |
| 3,506,599 | 4/1970 | Dean............ 260/2.5 F |
| 3,779,955 | 12/1973 | Wade............ 260/2.5 F |

Primary Examiner—Morton Foelak
Attorney, Agent, or Firm—Lawrence Rosen; E. Janet Berry

[57] ABSTRACT

A synthetic foam and a process for its preparation is disclosed comprising (a) a polymerized mass of at least 50 parts by weight of furfuryl alcohol, at least one part by weight of at least one amino compound selected from the group consisting of urea, thiourea and melamine, and up to 49 parts by weight formaldehyde, and (b) an equal or less amount of filler.

15 Claims, 6 Drawing Figures

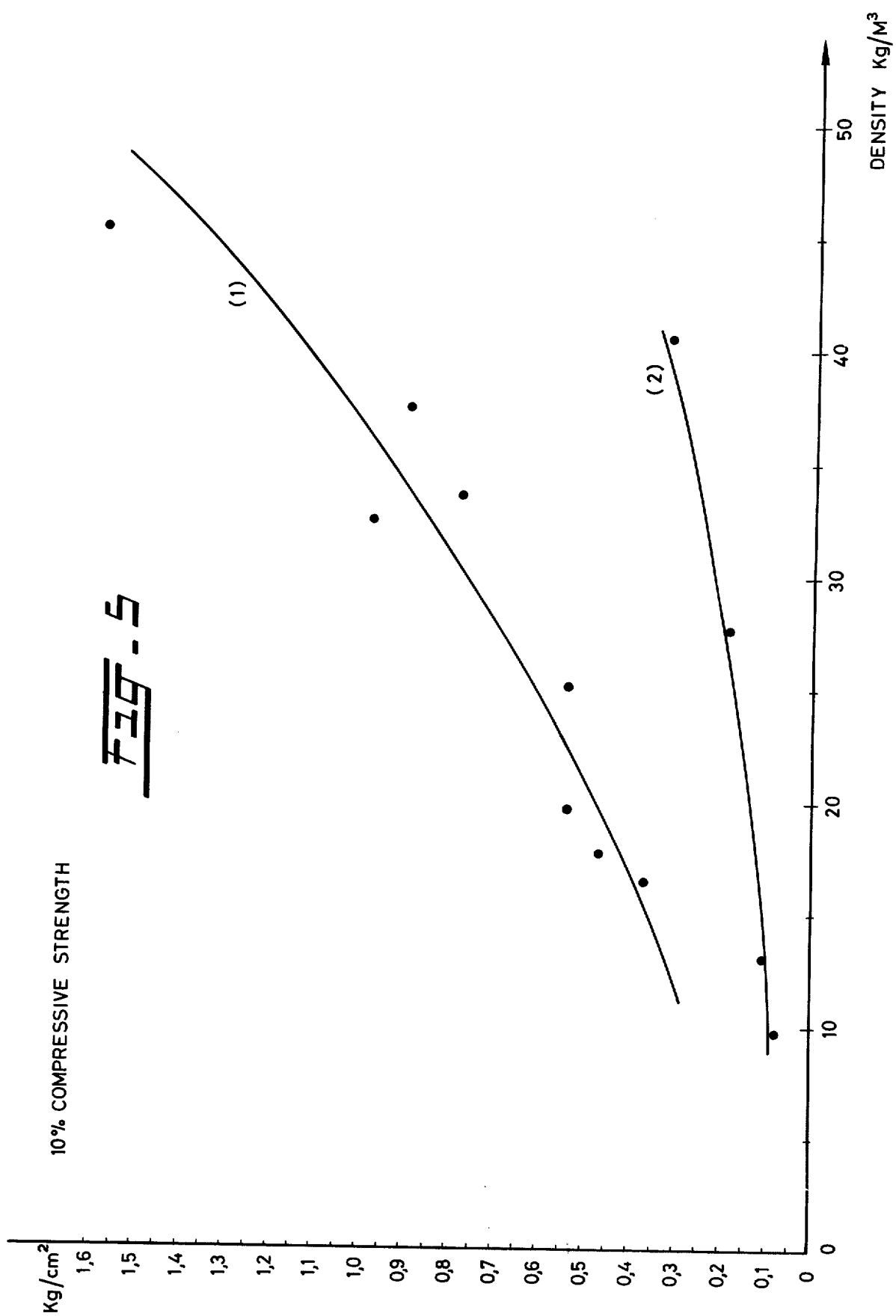

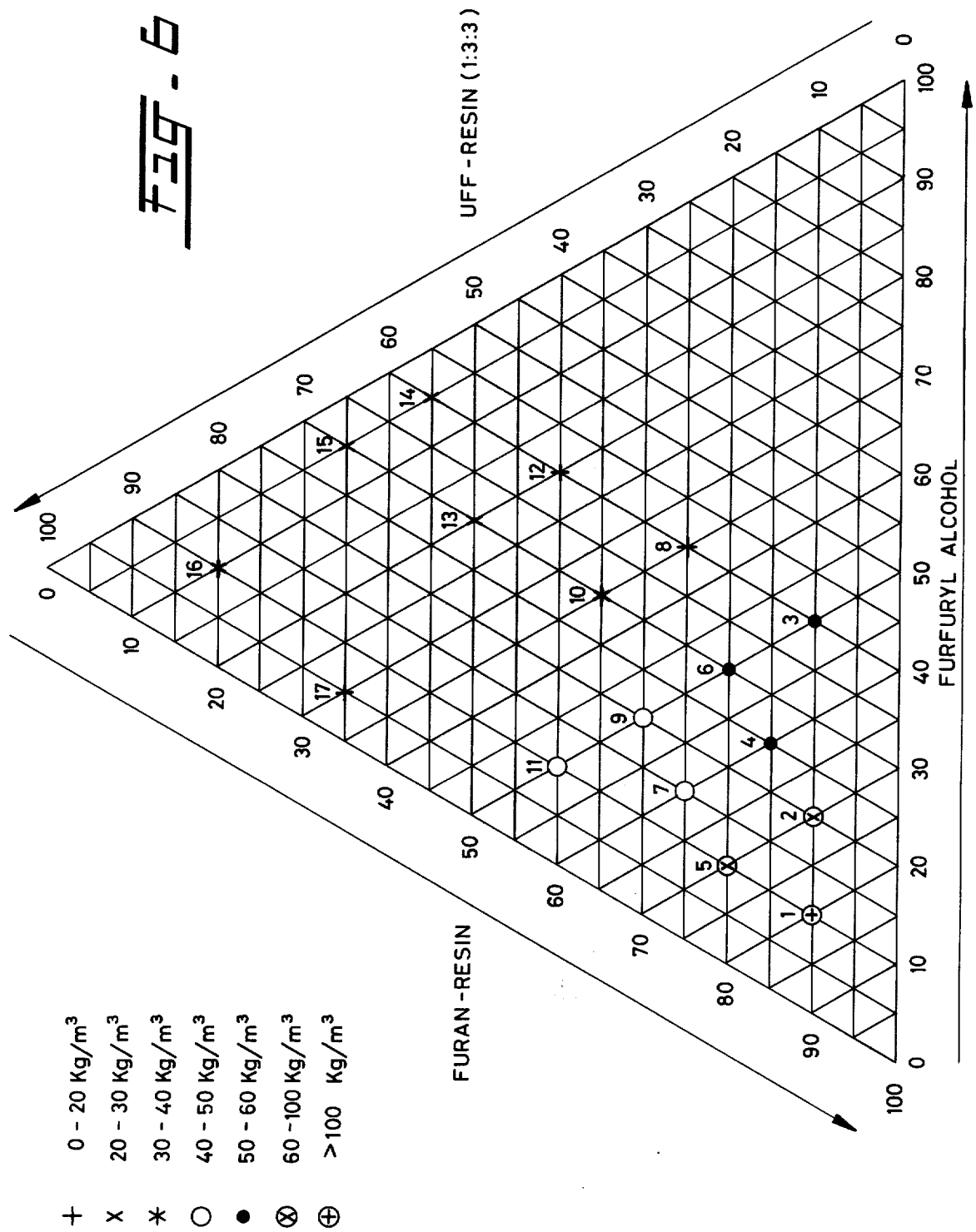

POLYFURAN FOAMS AND A METHOD OF PREPARING SAME

The present invention relates to an improvement in the process of preparing polyfuran foams by polymerizing, alternatively copolymerizing furfurylalcohol, if desired in combination with prepolymers, alternatively precopolymers of furfurylalcohol in the presence of a strong acid.

It is known to prepare rigid foams from urea formaldehyde with and without the inclusion of small amounts of furfurylalcohol, but the known foams are prepared by complicated processes, and the foams have a number of disadvantages limiting their use. The manufacture of rigid foam from urea-formaldehyde resins has become a well-developed art in recent years. While there are a number of modifications thereof employed in the preparation of the foams, the conventionally observed process concerns basically that of preparing an aqueous foam-like suspension of a urea-formaldehyde condensation product with the aid of a surface active agent. The suspension is aerated until it has the density which will give the type of product having the cellular structure desired. The foam suspension is then contacted with an acid catalyst, and cures preferably under the influence of elevated temperatures, which facilitates the hardening and partially frees the water used in preparing the aqueous suspension.

The removal of water from the foam severely limits the production capacity of a given plant and puts a limit to the size of foam blocks which can be made. According to U.S. Pat. No. 3.006.871 the maximum density of urea-formaldehyde foam which can be made is about 30 kg/m$^3$, as higher density foams will show severe cracking during the drying operation.

All of the urea-formaldehyde foams generally suffer in that they are inherently relatively fragile and possess comparatively low resiliency and abrasion resistance characteristics.

According to U.S. Pat. No. 3.006.871 the fragility observed for urea-formaldehyde resin foams while mainly inherent in the nature of the condensate, is believed to be influenced by the mechanism with which the contained water leaves the aqueous foam during the hardening and drying procedure. According to said patent this influence can be reduced, and foams having superior and improved physical properties can be obtained by using urea-formaldehyde condensates modified with furfurylalcohol or furfural. The amount of furfurylalcohol employed is between 5 and 50 parts by weight per 100 parts by weight urea-formaldehyde condensate.

The foams produced by the modified urea formaldehyde condensates are claimed to have higher abrasion resistance and resilience than the unmodified foams. The foams are, however, still typical urea-formaldehyde foams with low compressive strength, low resistance to hydrolysis, and predominantly open cell structure. Also the process of their preparation includes the drying step with the undesirable consequence described above.

A new process for preparation of foams from urea formaldehyde condensate similarly modified with furfurylalcohol is disclosed in British Pat. No. 942,845. According to said patent a solid compound which generates a gas by reaction with an acid is mixed with the co-condensate prior to hardening. Preferred compounds for use as blowing agent are carbonates and bicarbonates, which liberate carbon dioxide upon contact with the acid hardener which may be for instance phosphoric acid. The molar ratios of urea to formaldehyde and of urea to furfurylalcohol of the cocondensate employed in the process are 1:2.6 and 1:0.9, respectively. The foams obtained by the process of said patent are chemically of the same type as those obtained by the process of U.S. Pat. No. 3.006.871. A serious defect of the new process is that the acid hardener must perform two competing functions. One is as a catalyst in the hardening process of the cocondensate, and the other is reacting with the bicarbonate, whereby the catalytic effect is destroyed — which makes control of foam density, cell size, and cure extremely difficult.

Furfurylalcohol resins prepared by the polymerisation or condensation of furfurylalcohol alone or in conjunction with formaldehyde are used for the manufacture of rigid cellular furan foams in the process of U.S. Pat. No. 3.390.107. According to said patent a rigid cellular expanded material may be obtained by a process which comprises expanding a preformed liquid furan resin containing low amounts of furfurylalcohol monomer in the presence of an acid catalyst and a blowing agent. The acid catalyst may be phosphoric acid and the blowing agent trichloro trifluoroethane. The cellular materials prepared have densities in the range of about 16 to 56 kg/m$^3$, and are of a partially open cell structure. Although the process is an improvement over the processes of U.S. Pat. No. 3.006.871 and British Pat. No. 942.845 the production of the foam includes the complicating step of preparing a high viscosity liquid furan resin and a postcure of the foams by heating, to ensure complete cure of the resin, and the foams have only moderate performance in various fire tests such as the muffle furnace test and the propane torch test. According to our copending application 43.033/71 said undesirable features may be avoided, and a foam material having additionally several desirable properties may be obtained by polymerizing furfurylalcohol in one step, if desired in combination with prepolymers or precopolymers of furfurylalcohol in the presence of an acid catalyst, provided that at least 50 percent of the hydroxy groups present in the furfurylalcohol prepolymer mixture originate from free furfurylalcohol.

Foams of densities down to 2 kg/m$^3$ showing improved performance in various fire tests and having very fine cell structure with large amounts of closed cells are obtained.

The density of the foams can be controlled by the amount of prepolymer in the furfurylalcohol, higher amount of prepolymer giving higher densities. It is, however, found that as the amount of prepolymer is increased the performance in the fire tests decreases, and foams prepared from furfurylalcohol/prepolymer mixtures in which less than 50 percent of the hydroxyl groups originate from the furfurylalcohol monomer show insufficient performance. For many applications foams of higher densities having high compressive strength and being less friable are desired.

It was found, that novel foams comprising:

α. 100 parts by weight of polymer of which at least 50 parts by weight of the material is derived from furfurylalcohol and at least one part by weight from at least one amino compound selected from the group consisting of urea, thio-urea and melamine together with up to 49 parts by weight of material derived from formaldehyde, and β. up to 100 parts by weight of a filler, alternatively an filler, have improved load bearing capacity and several other desirable features. They may be obtained from A) furfurylalcohol, if desired in the presence of B) prepolymers of furfuryl alcohol by using as a third component C) an amino formaldehyde resin in an amount corresponding to more than 1 part by weight of the amino compound, whereas the final foam still has to contain more than 50 parts by weight bound furfuryl alcohol per 100 parts by weight of A + B + C, the amino compound being selected from the group consisting of urea, thio-urea and melamine, excluding any combinations in which the parts by weight of A per 100 parts by weight of resin (A + B + C) plus twice the parts by weight of C per 100 parts by weight of resin (A + B + C) are less than 20. The furan foams thus modified show higher compressive strength than unmodified furan foams at the same density, and the modified foams can be prepared in much higher densities and obtain good performance in the fire tests.

An additional advantage of the modified furan foams as compared to the modified urea-formaldehyde foams of U.S. Pat. No. 3,006,871 and British Pat. No. 942,845 is that they can be prepared by the well-known "one-shot" technique used for preparing rigid polyurethane foams, that is in the absence of water and bicarbonate. The reason for this is probably that the amino formaldehyde furfuryl alcohol blends and/or condensates useful in the preferred process of the present invention have a suitable reactivity. Preferably the foam according to the invention contains a polymer having a composition falling within the area ABCDE of FIG. 1. In said triangular diagram the compositions by weight of the polymer part of the foams α are shown.

The coordinates in parts by weight per 100 parts by weight of resin are to be understood as:

1. Amino compound: material derived from an amino compound.
2. Formaldehyde: material derived from formaldehyde.
3. Furfuryl alcohol incl. furan-resin: material derived from furfuryl alcohol.

It is not intended that the term furan resins are used herein be restricted to the furan prepolymers resulting from the sole condensation of furfuryl alcohol. Thus, for example, other appropriate furan resins include precopolymers of furfuryl alcohol and furfural, or of furfuryl alcohol and formaldehyde, or of furfuryl alcohol, formaldehyde and phenol, or of furfuryl alcohol, formaldehyde and an aminocompound.

The foams of the present invention are found in the lower right corner of the triangle corresponding to more than 50 parts of furfuryl alcohol incl. furan-resin and more than 1 part of amino compound.

Particularly preferred are foams containing a polymer having a composition falling within the area WXYZ of FIG. 1. The molar ratio of the material derived from formaldehyde to the material derived from an amino compound is preferably between 1:1 and 6:1. Preferably the source for the material derived from an amino compound is urea. In a preferred embodiment the filler β has reacted with the polymer α. Particularly preferred is a filler consisting of a material containing hydroxyl and/or carbonyl groups. More particularly filler β is a lignin containing material. In a very useful product filler β is lignin sulfonate.

In the present process ureaformaldehyde furfuryl alcohol resins having a urea : formaldehyde ratio of 1:1 till 1:10, and a urea : furfuryl alcohol ratio of 1: at least 1, are used generally as urea-formaldehyde resins. Very useful urea-formaldehyde furfuryl alcohol resins have a urea : formaldehyde ratio of 1:1 till 1:6. Preferably at least 10 parts by weight of urea-formaldehyde resin per 100 parts by weight of A + B + C are used. Said urea-formaldehyde furfuryl alcohol resins are prepared according to known methods. In this connection reference is made to British Pat. No. 942,845, U.S. Pat. No. 3,006,871, Belgian Pat. No. 619,879 and British Pat. No. 930,236.

Though the product according to British patent application 43,033/71 (NF2) has many desired properties, some of the products have the defect of the newly discovered so-called second exotherm. A second exotherm reaction starts in foams prepared from high concentrations of furan resins when heated to about 200° C and due to the resulting high temperature said foams are destroyed. This second exotherm constitutes a fire risk and it has been discovered that for instance commercial phenolic foams show second exotherm.

A test for determining whether the second exotherm reaction will be developed is carried out in the following way.

A sample is cut with dimensions 6 × 6 × 6 cm. The sample is placed in the middle of an oven, the temperature of which is kept at 200° C. A thermocouple is inserted in the middle of the sample and the temperature of the foam recorded. In foams having a second exotherm the temperature of the foam will rise above 200° C and the maximum temperature is noted.

Figure 2:
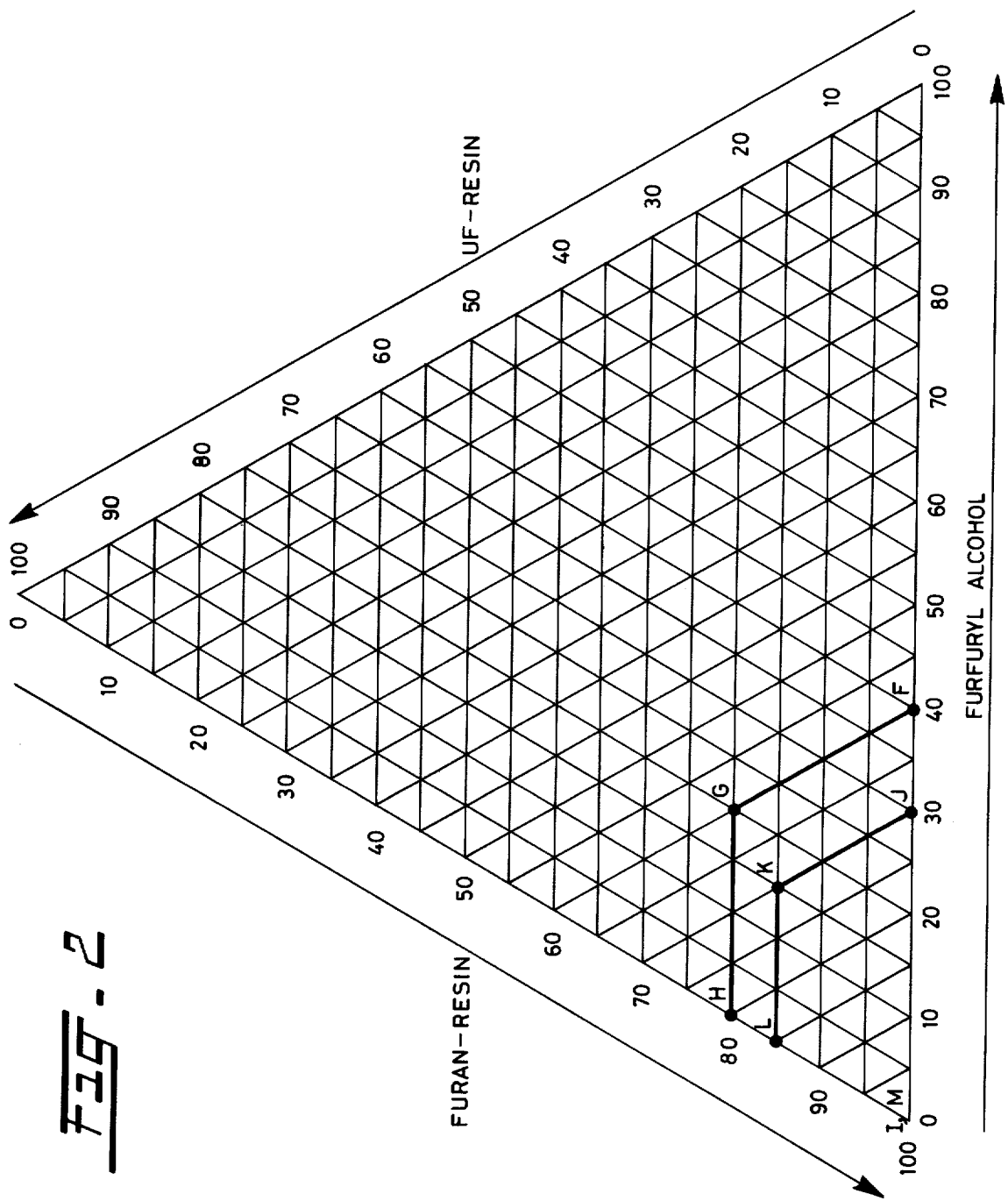

Foams containing a resin composition according to FIG. 2 (The triangular diagram of FIG. 2 has the coordinates: Furfuryl alcohol, Furan-resin, and Urea-formaldehyde resin; the base-line, corresponding to foams without ureaformaldehyde resin, represents foams made according to U.S. Pat. No. 3,390,107 and our co-pending No. 43,033/71.), excluding any compositions within the area JKLM of said figure, particularly foams having a composition falling within FIG. 2, excluding any compositions within the area FGHI of said figure, can be made free of a second exotherm.

The second exotherm of foams prepared from a) furfuryl alcohol, b) furan resin, and c) UFF resin (1:3:3) is voided by incorporatingthe component C, as appears from the comparative example XI mentioned here below. Foams having a composition falling within area PQRS of FIG. 3 have still a second exotherm, even if component C is present. However, the second exotherm reaction of said type of foams may be reduced considerably by adding to the foamable mixture a reactive filler, particularly a filler having hydroxyl and/or carbonyl groups, more particularly a lingin derivative containing filler and very particularly by using lignin sulphonate.

having a higher density. Preferably the reactive filler has a particle size of which at least 50 percent will pass through a British standard sieve of 72 mesh. The proportion of filler generally used is up to 100 parts by weight per 100 parts by weight of resin.

Figure 3:
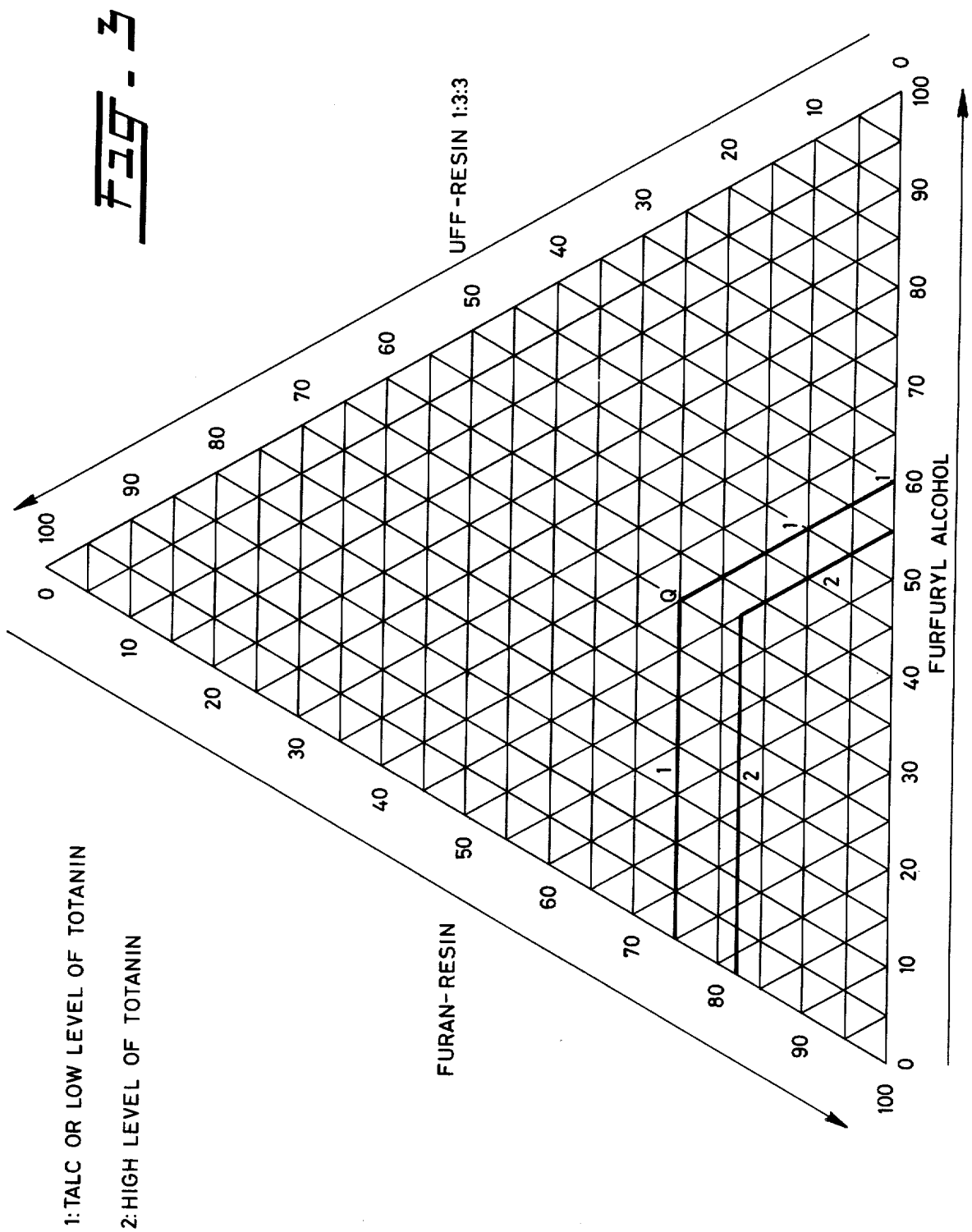

All unmodified NF2 foams are found at the baseline of FIGS. 1, 2 and 3 corresponding to 0 parts of urea-formaldehyde furfuryl alcohol resin.

From the examples it appears that foams can be made over a broad range of component ratios, with or without ammonium lignin sulphonate.

Variation in component ratios results in variation in foam properties, so desired properties can be obtained by selecting proper foam formulations.

The density can be increased by
1. high levels of furan resin;
2. high levels of ammonium lignin sulphonate.

From FIG. 3 (in the diagram with the coordinates furfuryl alcohol, furan-resin, and UFF-resin having a molar ratio of 1:3:3, is shown the area inside which the foams of example XI have second exotherm. The effect of type and amount of filler is demonstrated by the size of the areas. With high levels of lignin sulphonate a wider range of component ratios can be used to prepare exothermfree foams compared to foams with talc and low levels of lignin sulphonate. It also appears, that the foams with second exotherm are concentrated in the lower left corner of the triangle, corresponding to high levels of furan resin. Those resin compositions giving foams having a second exotherm can be expressed as Furan resin more than 45 parts plus
UFF resin <20 parts.

Even at furfuryl alcohol levels as low as 10 parts, the exotherm can be removed by 20 parts of UFF resin having a molar ratio of 1:3:3.

From FIG. 3 appears, that in case the ammonium lignin sulphonate is replaced by talc, the second exotherm is still concentrated in the area of high level of furan resin. The amount of UFF resin having a molar ratio of 1:3:3 needed in this case to remove the exotherm at a constant level of furan resin is about 25 parts by weight.

From FIG. 6 (In the diagram the formulations of the foams in example XXXV are shown using as coordinates: furfuryl alcohol, furan-resin and urea : formaldehyde-furfuryl-alcohol-resin (1:3:3).) appears that low density foams (<20 kg/m³) are found only in the areas of a. less than 40 parts of furan resin,
b. more than 35 parts of furfuryl alcohol.

A borderline can be drawn separating foams with densities below and above 40 kg/m³. This line represents 40 parts of furan resin.

It has appeared that a more exact indication of the nonflammability may be obtained by determining the critical oxygen index, as defined in ASTM D 2863 (critical oxygen index is the minimum concentration of oxygen, expressed as volume percent, in a mixture of oxygen and nitrogen that will just support combustion of a material under the conditions of said method.), than by using the propane torch test as used in the prior British patent application 43.033/71.

It appears from the examples, that the critical oxygen index is dependent on foam formulation, however the foams according to the invention have an unexpected high critical oxygen index.

Two types of end-points have been observed, i.e. flash over and burning. In some cases the burning was followed by afterglow. Burning and afterglow are found in foams having a second exotherm. Said foams contain more than 50 parts by weight of furan resin and less than 25 parts by weight of urea-formaldehyde furfuryl resin.

EXAMPLE I

A urea formaldehyde-furfurylalcohol resin was prepared according to the method described in British Pat. No. 942,845, Example No. 1. The molar ratio of Urea: formaldehyde: furfurylalcohol was 1 : 2.6 : 0.9.

100 g of the resin was mixed with 5 g sodiumbicarbonate whereupon 22 g of 75% o-phosphoric acid was added under vigorous stirring. However, due to the instantaneous reaction between the acid and the bicarbonate, the gas-evolution started before the resin and the catalyst were properly mixed, and a foamed material having a very irregular cell-structure was obtained. The foam had a density of about 100 kg/m³, was hard and brittle with very coarse cells.

In another experiment 100 g of the resin and 5 g of sodiumbicarbonate were mixed with 24 g of catalyst consisting of 8g of o-$H_3PO_4$ (87 %), 4 g of $H_2SO_4$ and 12 g of isopropanol. The resulting foam was similar to the above mentioned. In order to be able to obtain a proper mixing of the resin and the catalyst and thereby improving the cell-structure, bicarbonate was replaced by an organic liquid volatizing during the polymerization.

100 g resin were mixed with
12 g of tricloro-trifluor ethane
5 g of o-phosphoric acid (87%) were added.

After 2 seconds of mixing the foaming started. The resulting foam showed a severe shrinkage and a poor cell-structure. To a similar mixture of resin and blowing agent was added a catalyst consisting of 5 g of a mixture of o-phosphoric acid (87%), conc. sulfuric acid and isopropanol (2:1:3 p.b.W.). The creamtime was 18 sec. which was sufficient for a good mixing of resin and catalyst. The mixture expanded to about 50 times its original volume but due to the slow cure the foam showed a severe shrinkage, and the final foam showed a density of over 100 kg/m³. Due to the high reactivity of the resin the amount of catalyst could not be increased in order to overcome the slow cure responsible for the shrinkage.

EXAMPLE II

A number of foams were prepared with broad variations in the composition of the polymer. The formulations are stated together with properties of the foams in table A below. The foams were made by mixing urea formaldehyde furfuryl alcohol resin prepared according to example XIII, Furan-resin prepared according to example XII, and furfuryl alcohol and adding to the mixture a surfactant, a blowing agent and a filler. In Foams nos. a to e further urea and/or formaldehyde was included in the resin. To this mixture was added under vigorous stirring the catalyst consisting of a mixture of acids in butanediol. When catalyst and resin were properly mixed, the mixture was poured into an aluminium mould with dimensions 120 × 200 × 50 mm and allowed to rise. The foams cured rapidly and no aftercure was needed. Cream- and risetime were noted and shrinkage was measured by an internal scale from 0 (no shrinkage) to 3 (severe shrinkage, collapse). The foams were cut and cell-structure characterized by the homogenity scale going from 0 (no splits or voids) to 3 (a number of small splits and/or a few voids). The density of the foams was measured and in some cases the 10 percent compressive strength was measured using the ASTM-test D 1621-64. All of the foams are of good quality and have improved abrasion resistance over the known foams. From Table A it can be seen that the properties of the foams can be varied by changing the composition of the polymer. Generally foams with low content of furfuryl alcohol and high content of furan-resin tend to be a little more hard and brittle and to have a slightly coarser cell structure, whereas foams containing low amounts of furfuryl alcohol and low content of furan-resin have a very fine cell structure and very small cells. Also these foams are more tough and resilient and show better resistance to vibrational fatigue.

From foams no. *i* and *j* appears that foams having the same composition can be made with different densities using different formulations. The foams showed very good performance in fire tests. For instance burn through times in the U.S. Bureau of Mines Propane Torch Test were 5 to 10 times those of commercial phenol formaldehyde foams.

the present invention, whereas foams no *f–o* are foams modified with an aminocompound (urea) and having a composition falling within the claims of the present patent application. The foams were made using the technique described in example II.

The compressive strength of the foams is depicted in FIG. 5, which clearly shows that foams modified with urea (1) have much higher strength at comparable densities than foams without urea (2).

TABLE A

| A | Composition of polymer, parts per 100 parts polymer | | | E | F | G | H | I | J | K | L | M | N | O | P | Q | R | S | T |
|---|---|---|---|---|---|---|---|---|---|---|---|---|---|---|---|---|---|---|---|
| | B | C | D | | | | | | | | | | | | | | | | |
| a | 5 | 45 | 50 | 37.7 | 12 | 13 | 1 | | 37.3 | 20 | 3 | 10 | | 39 | 45 | ½ | 0 | 19.62 | |
| b | 15 | 35 | 50 | 75.5 | | | 1 | 4.8 | 19.7 | 20 | 3 | 10 | | 17 | 41 | 0 | 0 | 32.69 | |
| c | 25 | 25 | 50 | 75.5 | | | 1 | 14.8 | 9.7 | 20 | 3 | 10 | | 26 | 100 | 0 | 0 | 44.83 | |
| d | 5 | 35 | 60 | 37.1 | 17.5 | 17.9 | 1 | | 27.5 | 20 | 3 | 10 | | 79 | 49 | ½ | 0 | 13.59 | |
| e | 20 | 20 | 60 | 90.6 | | | 1 | 7.8 | 1.6 | 20 | 3 | 10 | | 25 | 71 | 0 | 0 | 19.98 | |
| f | 10.5 | 21 | 68.5 | 100* | | | 1 | | | 20 | 3 | | 10 | 30 | 90 | ½ | 0 | 23.67 | |
| g | 13.5 | 20.3 | 66.2 | 100 | | | 1 | | | 20 | 3 | | 10 | 27 | 63 | ½ | 0 | 13.09 | |
| h | 10.8 | 16.2 | 73 | 160 | 20 | 20 | 2 | | | 75 | 6 | 25 | | 38 | 47 | ≤½ | 0 | 34.26 | 0.43 |
| i | 5.4 | 8.1 | 86.5 | 80 | 100 | 20 | 2 | | | 75 | 6 | 30 | | 61 | 81 | ½ | 0 | 45.37 | 0.69 |
| j | 5.4 | 8.1 | 86.5 | 80 | 40 | 80 | 2 | | | 75 | 6 | 35 | | 57 | 44 | 1 | 0 | 16.44 | 0.16 |
| k | 1.35 | 2.03 | 96.62 | 20 | 140 | 40 | 2 | | | 75 | 6 | 40 | | 45 | 17 | 0 | 0 | 76.16 | 1.4 |
| l | 1.35 | 2.03 | 96.3 | 20 | 100 | 80 | 2 | | | 75 | 6 | 50 | | 39 | 8 | 0 | 0 | 58.11 | 1.2 |

A: Foam No.
B: Urea
C: Formaldehyde
D: Furfuryl alcohol incl. furan resin
E: UFF-resin 1:3:3
F: Furan-resin
G: Furfuryl alcohol
H: Silicone
I: Urea
J: Formaldehyde
K: ammonium lignin sulphonate
L: n-Hexane
M: $H_3PO_4$:$H_2SO_4$:1,4 Butanediol 4:2:4.5
N: $H_3PO_4$:$H_2SO_4$:Isopropanol 4:2:6
O: Cream time sec
P: Rise time sec
Q: Shrinkage
R: Homogenity
S: Density, kg/m³
T: 10% compressive strength, kg/cm²
*the urea-formaldehyde furfurylalcohol resin used in this foam had a molar ratio of 1:4:4.

EXAMPLE III

Two series of foams were prepared using the formulations given in table C. The foams no *a–e* are furan foams prepared according to known procedures, according to U.S. Pat. No. 3.390.107 and British patent application 43.033/71. Their compositions are outside

EXAMPLE IV

Very good foams have been made using different fillers. In table C typical results of using an inorganic non-reactive filler, talc, and an organic reactive filler, ligninsulphonate, are given.

All foams have a fine cell-structure and good mechanical properties. It is demonstrated that the use of ammonium lignin sulphonate in place of talc makes it possible to prepare foams of higher density from same level of furfurylalcohol.

It is also evident that ammonium lignin sulphonate increases the risetime of a given formulation, which is a definite advantage in the production of moulded articles.

TABLE C

| A | Composition of polymer part per 100 parts of polymer | | | E | F | G | H | I | J | K | L | M | N | O | P | Q | R | S |
|---|---|---|---|---|---|---|---|---|---|---|---|---|---|---|---|---|---|---|
| | B | C | D | | | | | | | | | | | | | | | |
| a | | 3.9 | 96.1 | | 30 | 20 | 2 | 1 | 10 | | | | | 6 | | 24 | 9.8 | 0.08 |
| b | | 3.9 | 96.1 | | 35 | 15 | 2 | 1 | 10 | | | | | 6 | | 24 | 13.1 | 0.11 |
| c | | 3.9 | 96.1 | | 40 | 10 | 2 | 1 | 10 | | | | | 6 | | 24 | 16.4 | 0.12 |
| d | | 3.9 | 96.1 | | 45 | 5 | 2 | 1 | 10 | | | | | 6 | | 24 | 27.7 | 0.19 |
| e | | 3.9 | 96.1 | | 50 | 0 | 2 | 1 | 10 | | | | | 6 | | 24 | 40.6 | 0.33 |
| f | 4.4 | 6.3 | 88.8 | 25 | 50 | | | 1 | | | 5 | | | 6 | | 24 | 13.0 | 0.32 |
| g | 5.9 | 8.9 | 85.2 | 25 | 32 | | | 1 | | | 5 | | | 6 | | 12 | 37.5 | 0.9* |
| h | 6.1 | 9.2 | 84.6 | 50 | 45 | 15 | | 1 | | | | 30 | | 10 | 6 | 21 | 33.7 | 0.78 |
| i | 4.7 | 7.1 | 88.2 | 70 | 91 | 39 | 2 | | | 45 | | | | | 6 | 42 | 16.5 | 0.37 |

TABLE C-continued

| A | Composition of polymer part per 100 parts of polymer | | | E | F | G | H | I | J | K | L | M | N | O | P | Q | R | S |
|---|---|---|---|---|---|---|---|---|---|---|---|---|---|---|---|---|---|---|
|   | B | C | D | | | | | | | | | | | | | | | |
| j | 6.8 | 10.2 | 83.1 | 100 | 70 | 30 |   |   | 2 |   |   |   |   | 45 |   | 6 | 42 | 17.8 | 0.47 |
| k | 4.7 | 7.1 | 88.2 | 70 | 91 | 39 |   |   | 2 |   |   |   |   | 45 |   | 6 | 42 | 19.8 | 0.54 |
| l | 4.7 | 7.1 | 88.2 | 70 | 91 | 39 |   |   | 2 |   |   |   |   | 75 |   | 6 | 42 | 25.2 | 0.54 |
| m | 6.8 | 10.2 | 83.1 | 100 | 92.3 | 7.7 |   |   | 2 |   |   |   |   | 75 |   | 6 | 42 | 32.6 | 0.98 |
| n | 6.8 | 10.2 | 83.1 | 70 | 120 | 10 |   |   | 2 |   |   |   |   | 45 |   | 6 | 42 | 45.5 | 1.56 |
| o | 1.35 | 2.0 | 96.6 | 20 | 140 | 40 |   |   | 2 |   |   |   |   | 75 |   | 6 | 40 | 76.2 | 1.40 |

A: Foam No.
B: Urea
C: Formaldehyde
D: Furfuryl alcohol incl. furan resin
E: UFF-resin 1:3:3
F: Furan-resin
G: Furfuryl alcohol
H: Paraformaldehyde
I: Silicone surfactant
J: Talcum
K: ammonium lignin sulphonate
L: carbon-black
M: Phenol
N: Freon 113
O: n-Hexane
P: $H_3PO_4$—$H_2SO_4$ isopropanol 4:2:6
Q: $H_3PO_4$—$H_2SO_4$ 1,4 Butanediol 4:2:4,5
R: Density kg/m³
S: 10% compressive strength, kg/cm²
*5% compressive strength.

TABLE D

| A | Composition of polymer | | | E | F | G | H | I | J | K | L | M | N | O | P | Q | R |
|---|---|---|---|---|---|---|---|---|---|---|---|---|---|---|---|---|---|
|   | B | C | D | | | | | | | | | | | | | | |
| a | 1.35 | 2.0 | 96.6 | 20 | 100 | 80 | 75 |   | 2 | 6 | 50 | 38 | 5 | 25.4 | 0 | 540 | 21.3 |
| b | 3.4 | 5.1 | 91.6 | 50 | 70 | 80 | 75 |   | 2 | 6 | 40 | 49 | 13 | 10.2 | ½ | 505 | 49.3 |
| c | 10.8 | 16.2 | 73.0 | 160 | 20 | 20 | 75 |   | 2 | 6 | 25 | 49 | 40 | 13.4 | ≤ ½ | 290 | 20.8 |
| d | 1.35 | 2.0 | 96.6 | 20 | 100 | 80 |    | 75 | 2 | 6 | 50 | 39 | 9 | 52.1 | 0 | 660 | 11.4 |
| e | 3.4 | 5.1 | 91.6 | 50 | 70 | 80 |    | 75 | 2 | 6 | 40 | 57 | 33 | 16.7 | ≤ ½ | 705 | 49.4 |
| f | 10.8 | 16.2 | 73.0 | 160 | 20 | 20 |    | 75 | 2 | 6 | 25 | 38 | 48 | 34.3 | ≤ ½ | 670 | 19.5 |

A: Foam No.
B: Urea parts
C: Formaldehyde parts
D: Furfuryl alcohol incl. furan resin
E: UFF-resin 1:3:3
F: Furan resin
G: Furfuryl alcohol
H: Talcum
I: ammonium lignin sulphonate
J: Silicone
K: n-Hexane
L: $H_3PO_4$—$H_2SO_4$ 1,4 Butanediol 4:2:4,5
M: cream time sec.
N: Rise time sec.
O: Density kg/m³
P: Shrinkage
Q: Time to burn through in sec.
R: Time to burn through to unit density sec/kg/m³

Two commercial phenol formaldehyde foams of density 21.0 and 17.7 kg/m³ gave times to burn through of 32.2 and 31.0 seconds, respectively.

EXAMPLE V

A foam was prepared using
  120 g of Urea-formaldehyde-furfurylalcohol resin (molar ratio 1:3:3)
  50 g of Furan-resin
  30 g of Furfurylalcohol
  2 g of Silicone-surfactant
  6 g of n-Hexane
and as filler
  75 g of icing sugar (ground sucrose).

The components were well mixed and 25 g of a catalyst, consisting of phosphoric acid, sulfuric acid and 1,4 Butanediol (4:2:4,5) was added under rapid stirring. The foam had a density of 51,7 kg/m³ and a 10 percent compressive strength of 2,12 kg/cm². The cell-structure was good and the foam was tough.

EXAMPLE VI

A foam was prepared using the same components as in example V, except that icing sugar was replaced by wood flour (75 g).

The foam had a density of 15,3 kg/m³ and a 10 percent compressive strength of 0,14 kg/cm². The cell-structure was good and the foam was tough.

EXAMPLE VII

A foam was prepared using the same components as in example V except that icing sugar was replaced by potato flour. The foam had a good cell-structure with an average cell size of 70 microns, a density of 22 kg/m³ and a compressive strength of 0,19 kg/cm².

EXAMPLE VIII

A foam was prepared using the same components as in example VI except that wood flour was replaced by 75 g of lignin-derivative (Borrebon Special from Borregaard, Norway). The result was similar to the results of example VI.

EXAMPLE IX

In this example it is demonstrated that good foams can be made with very different proportions of the three polymer components: urea-formaldehyde resin, furfurylalcohol and furfurylalcohol resin. As urea-formaldehyde resin two urea-formaldehyde-furfurylalcohol resins with molar ratios of the three components being 1 : 3 : 3 and 1 : 4 : 4. The furan resin is prepared according to example 16.

The formulations used are given in table D below. All the foams show good homogenity, fine cell-structure and fine resistance to vibrational fatigue.

Foam densities are dependent on the formulations and can be varied over a broad range by selecting the proper proportions of the three polymer components. It is also demonstrated that the type and amount of filler is an important factor which has a strong influence on the foam-properties.

EXAMPLE XI

Figure 4:
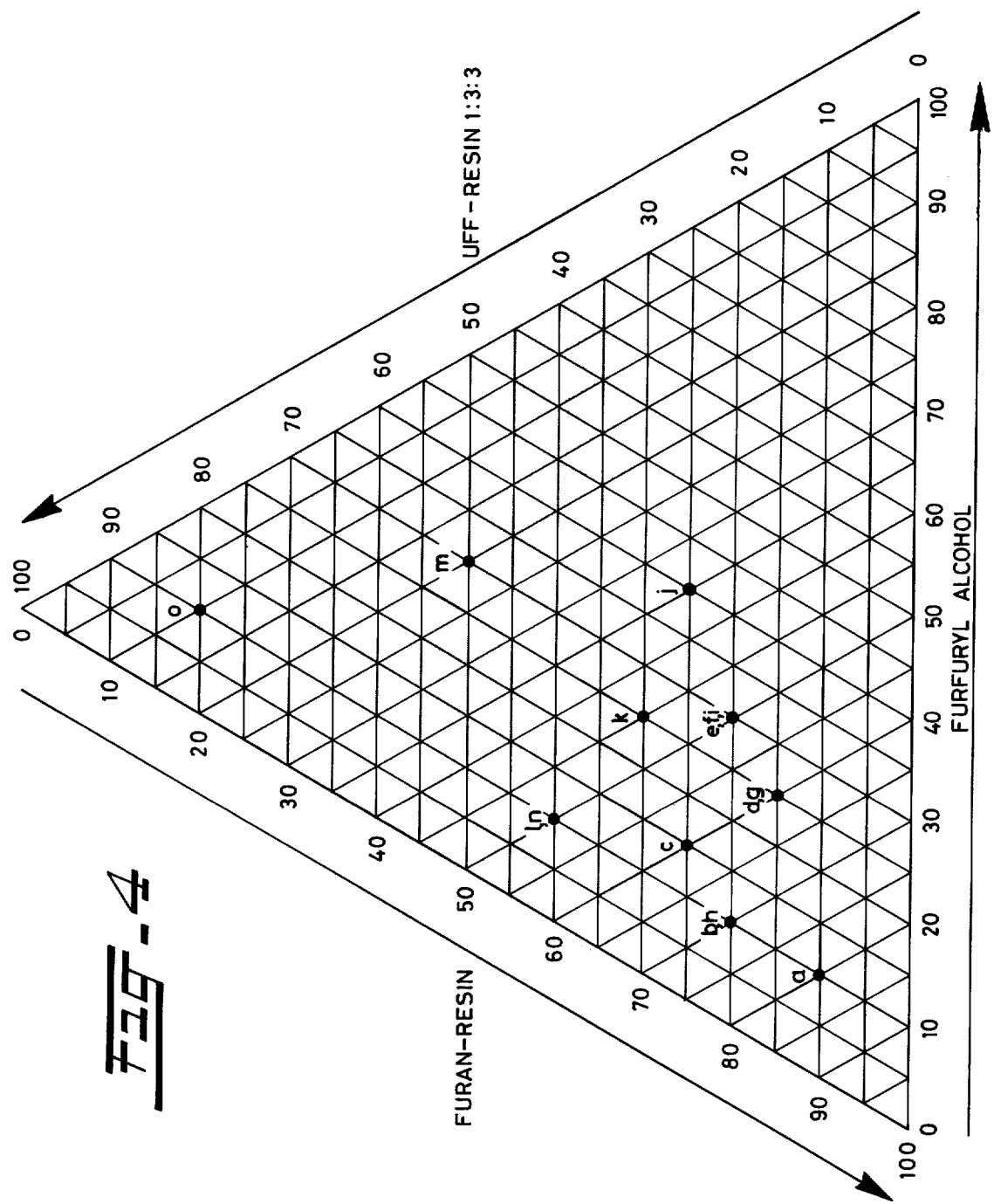

Foams were prepared using the formulations given in the table E. In FIG. 4 the component ratios are shown on a triangular diagram. Maximum temperature of the second exotherm was determined on the foams using the technique described in the introductory part of the present specification. Independent of the type and amount of filler, the foams having second exotherms are found in the lower left corner of the triangle diagram, corresponding to high levels of furan-resin and low levels of urea-formaldehyde-furfurylalcohol resin. The exact borderline between exotherm free foams and foams with second exotherm is dependent on the type of urea formaldehyde resin and amount of filler.

A comparison of foam No. 5 and No. 6 shows that the second exotherm is removed by substituting talc with ligninsulphonate.

A comparison of foams with different levels of ligninsulphonate as filler shows that the second exotherm is reduced or removed by increase in the level of filler.

In FIG. 3 the areas are shown in which the foams of this example have a second exotherm. The exotherm areas are found in the lower left corner of the triangle and the effect of type and amount of filler is demonstrated by the different size of the areas.

Table E.

|  | a | b | c | d | e | f | g | h | i | j | k | l | m | n |
|---|---|---|---|---|---|---|---|---|---|---|---|---|---|---|
| UFF-resin 1:3:3 | 40 | 130 | 130 | 50 | 30 | 160 | 100 | 50 | 20 | 160 | 80 |  |  |  |
| UFF-resin 1:4:4 |  |  |  |  |  |  |  |  |  |  |  | 130 | 40 | 160 |
| furan-resin | 140 | 60 | 10 | 70 | 120 | 20 | 40 | 70 | 100 | 20 | 40 | 60 | 140 | 20 |
| furfuryl alcohol | 20 | 10 | 60 | 80 | 50 | 20 | 60 | 80 | 80 | 20 | 80 | 10 | 20 | 20 |
| silicone surfactant | 2 | 2 | 2 | 2 | 2 | 2 | 2 | 2 | 2 | 2 | 2 | 2 | 2 | 2 |
| lignin-sulphonate | 75 | 75 | 75 | 75 |  |  |  |  | 40 | 40 | 40 | 75 | 75 | 75 |
| talc |  |  |  |  | 75 | 75 | 75 | 75 |  |  |  |  |  |  |
| n-Hexane | 6 | 6 | 6 | 6 | 6 | 6 | 6 | 6 | 6 | 6 | 6 | 6 | 6 | 6 |
| $H_3PO_4$:$H_2SO_4$: 1,4 Butanediol (4:2:4:5) | 25 | 25 | 25 | 40 | 50 | 25 | 25 | 40 | 55 | 25 | 30 | 25 | 30 | 25 |
| cream time, sec. | 126 | 42 | 73 | 57 | 34 | 49 | 80 | 49 | 45 | 55 | 87 | 52 | 90 | 66 |
| rise time, sec. | 73 | 78 | 89 | 31 | 5 | 40 | 39 | 13 | 7 | 42 | 38 | 110 | 105 | 144 |
| density, 10 kg/m³ | 82.3 | 32.4 | 25.5 | 16.7 | 33.3 | 13.4 | 16.4 | 10.2 | 51.9 | 20.8 | 12.0 | 44.7 | 86.4 | 43.7 |

EXAMPLE X

Foams were prepared using the same formulations as in example IX, but replacing the furan-resin, prepared according to example XVIII by a commercially available furan-resin, (Durez 16470, from Hooker Chemical S.A., Belgium).

Results similar to the results of example IX were obtained.

Two commercial phenol formaldehyde foams showed very heavy second exotherm when tested similar to the foams above. The maximum temperatures recorded were 580° and 595°C and the evolution of heat and smoke continued for a considerable time.

EXAMPLE XII

Preparation of furan-resin.
35 kg of furfurylalcohol and
10 kg of water

TABLE F

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| UFF-resin 1:3:3 | 20 | 40 | 50 | 30 | 40 | 40 | 30 | 40 | 40 | 50 | 60 | 80 | 100 | 80 | 160 |
| Furan resin | 150 | 140 | 120 | 120 | 100 | 100 | 120 | 140 | 100 | 70 | 100 | 100 | 40 | 100 | 20 |
| Furfuryl alcohol | 20 | 20 | 30 | 50 | 60 | 60 | 50 | 20 | 60 | 80 | 40 | 20 | 60 | 20 | 20 |
| Silicone surfactant | 2 | 2 | 2 | 2 | 2 | 2 | 2 | 2 | 2 | 2 | 2 | 2 | 2 | 2 | 2 |
| Lignin sulphonate | 75 | 75 | 75 | 75 | 75 |  |  | 40 | 40 | 75 | 75 |  |  | 40 | 40 |
| Talc |  |  |  |  |  | 75 | 75 |  |  |  |  | 75 | 75 |  |  |
| n-Hexane | 6 | 6 | 6 | 6 | 6 | 6 | 6 | 6 | 6 | 6 | 6 | 6 | 6 | 6 | 6 |
| $H_3PO_4$:$H_2SO_4$: 1,4 Butanediol (4:2:4:5) | 25 | 25 | 25 | 50 | 25 | 25 | 50 | 30 | 30 | 40 | 25 | 30 | 25 | 30 | 25 |

TABLE F-continued

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Density, kg/m³ | 105 | 82.3 | 43.6 | 50.5 | 56.0 | 18.4 | 33.3 | 39.6 | 31.9 | 16.7 | 47.5 | 18.5 | 16.4 | 23.8 | 20.8 |
| Max.temperature of 2nd exotherm °C | 415 | 275 | 220 | 460 | 210 | 310 | 575 | 355 | 540 | 200 | 200 | 200 | 200 | 200 | 205 | was charged to a 45 l reaction vessel equiped with mantle, stirrer, thermometer, and vacuum destillation equipment.

The mixture was heated to 65°C and sulphuric acid (1 normal) was added until a pH between 2.4 and 2.5 was reached. During the entire reaction period the pH was measured and kept at 2.4 – 2.5. After 5 hours the temperature was raised to 85°C. The reaction was followed by measuring the refractive index of the resin-phase. At a refractive index of 1.5400 the reaction was stopped by neutralizing with sodiumhydroxide. The aqueous layer was separated and discarded, and residual water removed by vacuumdistillation. The resin was a clear red-brown liquid having a viscosity of 1,250 cps (25°C) and an OH-equivalent weight of 356. This furan-resin and other resins prepared by this method have been used in a number of the above mentioned foams.

EXAMPLE XIII

Preparation of urea-formaldehyde-furfurylalcohol resin.

6.25 kg of urea,
9.35 kg of paraformaldehyde, and
30.4 kg of furfurylalcohol (molar ratio 1:3:3)

was mixed in a 45 l reaction vessel equipped with stirrer, heating and cooling mantle, thermometer and vacuum-distillation equipment. 100 ml of 4 N ammoniumhydroxyde was added.

The temperature was kept at 90°C and the pH kept between 9 and 10 for 2.5 hours by addition of 4 N sodiumhydroxide. The temperature was then lowered to 80°c and the pH changed to 2.5 by addition of 4 N sulphuric acid. When the viscosity of the mixture had increased to 300 cps (25°C) the mixture was neutralized with sodium hydroxide and water was removed by vacuum distillation. The product was a clear yellow resin having a viscosity of around 25.000 cps. The OH-value determined after a standard procedure was 408.2 corresponding to an OH-equivalent weight of 137.5. This resin has been used in a number of the above mentioned examples.

EXAMPLE XIV

A resin was prepared similarly to the resin in Example XIII except that furfurylalcohol was replaced by propyleneglycol.

A foam was made by mixing
80 g of the resin,
100 g of furan-resin,
20 g of furfurylalcohol,
2 g of silicone surfactant,
75 g of lignin sulphonate,
6 g of n hexane, and
as a catalyst,
30 g of a mixture of o-phosphoric acid (87%) sulphuric acid, and 1.4-Butanediol (weight ratio 4 : 2 : 4.5).

Creamtime was 153 sec., rise time 237 sec. Density of the foam 109 kg/m³. The foam showed no second exotherm, and had very good mechanical properties and a fine cell-structure. After the exotherm test, that is 30 min. at 200°C, the mechanical properties of the foam were still very good.

EXAMPLE XV

Using the method of example XIII a resin was prepared using,
1.8 kg of urea,
3.8 kg of paraformaldehyde,
11.8 kg of furfurylalcohol (molar ratio 1 : 4 : 4)

The resin obtained was very similar to the resin of example XIII. Foams prepared using this resin are mentioned in example IX. (l, m and n).

EXAMPLE XVI

Using the method of example XIII a resin was prepared from,
3.12 kg of urea,
4.7 kg of paraformaldehyde,
30.4 kg of furfurylalcohol, (molar ratio 1 : 3 : 6).

In this case the reaction was stopped at a viscosity of the reaction mixture of 75 cps. The resin obtained after distillation was clear reddish orange and had a viscosity of 3000 cps.

EXAMPLE XVII

A foam was prepared using 200 g of resin prepared according to example XVI. The resin was mixed with 2 g of silicone surfactant, 6 g of n-hexane, and 40 g of ligninsulphonate. 25 g of catalyst (phosphoric acid : sulphuric acid : 1.4 Butanediol(4 : 2 : 4.5 pbw) was added under agitation and the mixture allowed to expand. The foam had a very fine cell-structure, a density of 13.5 gk/m³ and showed no 2nd exotherm.

EXAMPLE XVIII

Using the method of example XIII a resin was prepared from,
1.56 kg of urea,
2.35 kg of paraformaldehyde,
30.4 kg of furfurylalcohol, (molar ratio 1 : 3 : 12).

The resin was clear dark brown and had a viscosity of 4.500 cps.

EXAMPLE XIX

A foam was prepared using,
100 g of resin prepared according to example XVIII,
50 g of furan-resin prepared according to Example XII,
50 g of furfurylalcohol,
2 g of silicone surfactant,
12 g trichloro-trifluor ethane,
20 g of ligninsulphonate,
30 g of a catalyst mixture (o-phosphoric acid : sulphuric acid : 1.4 Butanediol 4 : 2 : 4.5 pbw).

The foam had a fine cell-structure and good mechanical properties. The density was 20.3 kg/m³.

Example XX

Using the method of example XIII a resin was prepared from,
- 3.0 kg of urea
- 15.8 kg of paraformaldehyde
- 19.8 kg of furfurylalcohol (molar ratio 1 : 10 : 4).

The resin obtained was similar to the resin of example XIII.

Example XXI

A foam was prepared using,
- 100 g of resin, prepared according to example XX
- 1 g of silicone surfactant
- 6 g of trichloro-trifluoro-ethane and as catalyst
- 15 g of a mixture of o-phosphoric acid (87%) : sulphuric acid : 1.4 Butanediol (4 : 2 : 4.5 pbw).

The foam had a very fine cell-structure and good mechanical properties. No second exotherm was observed.

Example XXII

Using the method of example XIII a resin was prepared from
- 12 kg of urea
- 3 kg of paraform aldehyde
- 9.8 kg of furfurylalcohol (molar ratio 1 : 0.5 : 0.5).

The resin obtained was similar to the resin of example XIII.

Example XXIII

A foam was prepared using
- 100 g of resin, prepared according to example XXII
- 50 g of Furan-resin, prepared according to example XII
- 50 g of furfurylalcohol
- 2 g of silicone surfactant
- 6 g of n-Hexane and as a catalyst
- 30 g of a mixture of o-phosphoric acid : sulphuric acid : 1.4 Butanediol (4 : 2 : 4.5 pbw).

The foam had fine cell-structure and was tough and resilent. No second exotherm was observed.

Example XXIV

A resin was prepared using
- 120 g of urea
- 250 g of paraformaldehyde
- 98 g of furfurylalcohol.

The components were mixed in a beaker and
- 3 ml of sodiumhydroxide and
- 2 ml of ammoniumhydroxide was added. Due to the dissolving of urea the temperature of the mixture starts to fall. After a short time, however, an exotherm reaction starts, raising the temperature to 40°-50°C.

After mixing for about half an hour the mixture is clear. The viscosity of the resin is about 1000 cps.

Example XXV

A foam was prepared using,
- 100 g of resin prepared according to example XXIV
- 1 g of a silicone surfactant and as a catalyst
- 8 g of a mixture of o-phosphoric acid : sulphuric acid : 1.4 Butanediol (4 : 2 : 4.5 pbw).

Creamtime was 27 sec., rise time 41 sec.

Another foam was prepared using
- 69.5 g of resin prepared according to example XXIV
- 30.5 g of furan resin prepared according to example XII
- 1 g of silicone surfactant and as a catalyst
- 10 g of the acid catalyst.

Cream time was 27 seconds, rise time 41 seconds.

Example XXVI

Resins were prepared using the method described in example XIII, replacing urea by
- a. urea and thio-urea 1 : 0.5 molar ratio
- b. melamine and urea 1 : 3 molar ratio.

Resins were obtained from which foams could be prepared using formulations similar to those in example XXV.

Example XXVII

A foam was prepared as described in example IX using the undermentioned formulation.

Speciments measuring 80 mm × 50 mm × 300 mm were cut from the foam and were adhesively banded and clamped to the flat vibration plate of a PYE - LING generator and vibrated at a range of frequencies and amplitudes of periods of 50 minutes as shown in table F. No evidence of failure was observed and on retesting no reduction in compression properties was found.

40 pbw furan resin, 60 pbw urea formaldehydr furfuryl alcolol resin, 20 pbw ammoniumligninsulphonate, 0.2 pbw silicone cell control agent and 6 pbw freon 113 to which was added 4.8 pbw propan-2-ol and 7.2 pbw tetraphosphoric acid.

Table G

| Frequency $H_z$ | Amplitude mm | Density kgm$^{-3}$ | 10% Compressive Strength KNm$^{-2}$ |
|---|---|---|---|
| Control |  | 25 | 40 |
| 25 | 5.85 | 22 | 40 |
| 75 | 3.05 | 26 | 36 |
| 250 | 0.28 | 28 | 40 |

Example XXVIII

Foams were prepared using the formulations given in table G.

Components A and B were mixed and the foams allowed to rise in an aluminium mould.

The density and the mechanical properties are shown in table G below. Also the oxygen index was measured. Two different types of catalyst-mixtures are used with propan-2-ol and 1.4 Butanediol respectively as diluent for the acid. The alcohol type has an influence on the foam density, propan-2-ol giving lower densities than Butanediol. Oxygene-index is slightly improved by use of propan-2-ol. It is noted that different types of end-points are observed in the test.

In fact no real burning of the foam takes place. In foam No 1 afterglow is seen corresponding to a second exotherm found in this foam.

All oxygen indices are high compared to other materials. A list of oxygen indices for other foams is given in Table H.

Table II

| Formulation Number | a | b | c | d | e | f |
|---|---|---|---|---|---|---|
| Component A | | | | | | |
| Furfuryl Alcohol g. | 3.9 | | 40 | | 20 | |
| Furan-resin g. | 46.1 | | | | 20 | |
| UFF-resin(1:3:3) g. | 50.0 | | 60 | | 60 | |
| Silicone surfactant g. | 1 | | 1.4 | | 1 | |
| Lignin-sulphonate g. | 37.5 | | 40 | | 20 | |
| Dimethoxymethane g. | | | 8 | | 8 | |
| Hexane g. | 3 | | | | | |
| Component B | | | | | | |
| Phosphoric Acid g. | 5.4 | 5.3 | 6.7 | 6.7 | 5.3 | 5.3 |
| Sulphuric Acid g. | 2.8 | 2.7 | 3.3 | 3.3 | 2.7 | 2.7 |
| Propan-2-ol g. | | 8 | | 10 | | 8 |
| Butane Diol g. | 6.2 | | 7.5 | | 6.0 | |
| Density Kgm$^{-3}$ | 50 | 31.8 | 14.6 | 11.3 | 15.1 | 13.0 |
| Compression Props. | | | | | | |
| Modulus KNm$^{-2}$ | 2500 | 1250 | 200 | 90 | 235 | 200 |
| 10% Stress KNm$^{-2}$ | 92 | 48 | 11.7 | 5.6 | 15.7 | 11.8 |
| 20% Stress KNm$^{-2}$ | 102 | 47 | 12.0 | 5.8 | 16.2 | 11.6 |
| 30% Stress KNm$^{-2}$ | 109 | 47 | 12.1 | 6.0 | 16.8 | 11.9 |
| Critical Oxygen Index | 37.8 flashed after glow | 38.2 slow-flash | 41.9 flashed | 44.8 flashed slight after glow | 38.1 flashed | 39.5 flashed |

Table I

Comparison of oxygen index for various organic foams

| Material | oxygen index |
|---|---|
| Polystyrene | 20 |
| Polystyrene fire retardant | 31 |
| Polyurethane | 22 |
| Polyurethane fire retardant | 24 |
| Polyisocyanurate | 31 |
| Phenol formaldehyde | 30 |

Example XXIX

A foam was prepared using
 60 g of a resin prepared according to example XIII
 20 g of a furan-resin prepared according to example XII
 20 g of furfurylalcohol
 1 g of a siliconesurfactant
 20 g of a ligninsulphonate
 8 g of Dimethoxymethane, and
 as a catalyst a mixture of
 12.8 g o-phosphoric acid
 3.2 g methanol.

The foam had a density of 16.0 kg/m$^3$.
 Mechanical properties were modulus 430 KN/m$^2$
 10 percent compressive strength 17.0 KN/m$^2$
 20 percent compressive strength 18.1 KN/m$^2$
 30 percent compressive strength 19.5 KN/m$^2$
 Critical oxygen index was 48.4.

Example XXX

Foams were prepared using the formulations given in table J. Component A and component B were mixed and the foam allowed to rise.

From the results it can be seen that the density is dependent on the type of filler and that density is increased by increased levels of lignin-sulphonate. A high level of lignin-sulphonate will also increase the critical oxygen index.

Table K

| Formulation Number | i | j | k | e | l |
|---|---|---|---|---|---|
| Filler type | talc | MgSO$_4$ | Lignin-sulphonate | | |
| Level g. | 20 | 20 | 5 | 20 | 40 |
| Density Kgm$^{-3}$ | 9.9 | 11.0 | 9.2 | 13.0 | 19.4 |
| Compressive Props. | | | | | |
| Modulus KNm$^{-2}$ | 65 | 293 | 220 | 200 | 740 |
| 10% Stress KNm$^{-2}$ | 4.5 | 10.0 | 10.5 | 11.8 | 23.5 |
| 20% Stress KNm$^{-2}$ | 5.9 | 10.3 | 10.7 | 11.6 | 23.4 |
| 30% Stress KNm$^{-2}$ | 6.8 | 10.8 | 10.9 | 11.9 | 23.5 |
| Critical Oxygen Index | 40.0 flashed | 40.5 flashed | 38.7 flashed | 39.7 flashed | 41.9 flashed |

Formulation
Component A
 20 g Furfuryl Alcohol, 20 g prepolymer, 60 g urea/formaldehyde furfuryl alcohol prepolymer, 1 g silicone, and filler (see table).
 8 g dimethoxymethane
Component B
 8 g propan-2-ol, 5.3 g o-phosphoric acid, 2.7 g sulphuric acid.

Example XXXI

Foams were prepared using the formulations given in table K.

The UF-resin was prepared according to example XIII except that furfurylalcohol was replaced by ethyleneglycol. The furan resin was a commercial resin Durez 16470 from Hooker Chemicals.

All foams had a very fine cell-structure and showed a good resistance to vibrational fatigue. No second exotherm was observed in the foams.

Table L

| Foam number | a | b | c | d | e |
|---|---|---|---|---|---|
| Furan-resin | 25 | 25 | 25 | 25 | 25 |
| UF-resin | 20 | 15 | 10 | 5 | 1 |
| Furfurylalcohol | 25 | 25 | 25 | 25 | 25 |
| Paraformaldehyde | 4 | 4 | 8 | 8 | 8 |
| Silicone surfactant | 1 | 1 | 1 | 1 | 1 |
| Freon 113 | 6 | 6 | 6 | 6 | 6 |
| Talc | 2.5 | 2.5 | 2.5 | 2.5 | 2.5 |
| o-phosphoric acid | 8 | 8 | 8 | 8 | 8 |
| Sulphuric acid | 4 | 4 | 4 | 4 | 4 |
| Propan-2-ol | 12 | 12 | 12 | 12 | 12 |
| Creamtime.sec. | 55 | 60 | 56 | 58 | 55 |
| Risetime.sec. | 15 | 15 | 12 | 6 | 4 |
| Density | 9.4 | 6.6 | 6.9 | 6.9 | 6.5 |
| Max. temp. during 2nd exotherm test at 200 degrees °C | 200 | 200 | 200 | 200 | 200 |

Example XXXII

A foam was prepared by mixing maldehyde-furfurylalcohol resin (UFF-resin) was prepared according to example XIII.

From the results of the test for second exotherm it is seen that

1. Foams without UFF-resin have a second exotherm when the content of furan-resin is about 50 percent. The exotherm can be removed by addition of sufficient paraformaldehyde. However, increased levels of paraformaldehyde reduce the foam-densities (foams No $a, b$ and $c$).

2. When higher amounts of furan-resin are used the densities are increased, but the second exotherm cannot be removed by high levels of paraformaldehyde (Foams No $d, e$ and $f$).

When low amounts of UFF-resin are included in the foamformulations the second exotherm is removed by low amounts of paraformaldehyde (Foams No $g$ and $h$) giving an acceptable density. When increased amounts of UFF-resin are employed it is possible to make foams without second exotherm having a sufficient high density and mechanical properties for handling in insulation work.

TABLE M

| Foam No. | a | b | c | d | e | f | g | h | i |
|---|---|---|---|---|---|---|---|---|---|
| UFF-resin 1:3:3 | — | — | — | — | — | — | 5 | 5 | 25 |
| Furan-resin | 50 | 50 | 50 | 70 | 90 | 90 | 47.5 | 47.5 | 60 |
| Furfuryl alcohol | 50 | 50 | 50 | 30 | 10 | 10 | 47.5 | 47.5 | 15 |
| Silicone surfactant | 2 | 2 | 2 | 2 | 2 | 2 | 2 | 2 | 2 |
| Paraformaldehyde | 2 | 4 | 12 | 12 | 4 | 12 | 1 | 3 | — |
| lignin sulphonate | 37.5 | — | — | — | — | — | 37.5 | 37.5 | 37.5 |
| Carbon-Black | — | — | — | — | 10 | — | — | — | — |
| Talcum | — | 5 | 5 | 20 | — | 10 | — | — | — |
| Freon 113 | 12 | — | — | 12 | 12 | 12 | 12 | 12 | 12 |
| $H_3PO_4$—$H_2SO_4$ 1,4 Butanediol 4:2:4.5 | 48 | — | — | — | — | — | 40 | 40 | 25 |
| $H_3PO_4$—$H_2SO_4$ Isopropanol 2:1:3 | — | 48 | 48 | 48 | 32 | 32 | — | — | — |
| Cream time sec. | 48 | 36 | 31 | 43 | 49 | 48 | 48 | 45 | 48 |
| Rise time sec. | 20 | 3 | 3 | 5 | 17 | 12 | 20 | 19 | 19 |
| Density kg/m³ | 15.1 | 8.8 | 6.0 | 13.3 | 22.5 | 20 | 14.6 | 11.6 | 20.0 |
| Max.temperature of 2nd exotherm °C | 540 | 580 | 200 | 220 | 625 | 640 | 540 | 200 | 200 |

50 g of a resin prepared according to example XIII
35 g of a furan-resin prepared according to example XII
15 g of furfurylalcohol
1 g of silicone surfactant
10 g of phenol
30 g of ammonium lignin-sulphonate
6 g of freon 113
To this mixture was added as catalyst
8 g of o-phosphoric acid
4 g of sulphuric acid
9 g of 1,4 Butanediol
under vigorous stirring. Creamtime was 49 sec., risetime 41 sec. Density 22 kg/m³. 10 percent compressive strength was 0.34 kg/cm².

The foam was placed at 250°C for about 1 hour. The foam becamse more brittle and the compressive strength was 0.36 kg/cm².

Example XXXIII

Foams were prepared using the formulations given in table L.

The furan-resin used in foams No $a, g, h$ and $i$ was prepared according to example XII. The resin used in foams No $b, c, d, e$, and $f$ was a commercial furan-resin (Durez 16470 from Hooker Chemicals). The urea-for-

Example XXXIV

A resin was prepared according to example XIV except that propyleneglycol was replaced by ethylene glycol.

A foam was prepared by mixing
25 g of said resin
25 g of furfurylalcohol
1 g of siliconesurfactant
4 g of paraformaldehyde
2.5 g of talc
6 g of Freon 113
To this mixture was added under stirring
8 g of o-phosphoric acid (87%)
4 g of sulphuric acid
12 g of propan-2-ol.

The cream time was 56 sec., rise time 8 sec. The foam was tough and had a fine cell-structure. The density was 16.2 kg/m³. The foam had no second exotherm.

Another foam was prepared using the same formulation, except that
25 g of furfurylalcohol was replaced by
12.5 g of furfurylalcohol, and
12.5 g of a commercial coprepolymer of furfurylalcohol and 12 percent formaldehyde.

The cream time as 56 sec., rise time 4 sec. Density 26 kg/m³. The foam had very fine cell-size and was tough. No second exotherm was observed.

Example XXXV

Foams were prepared using the formulation given in table M below. The foam densities were measured and the results plotted on a triangular diagram, FIG. 6. The coordinates were Furfuryl alcohol, Furan resin, and Urea-formaldehydefurfurylalcohol resin (molar ratio 1:3:3).

From FIG. 6 it appears that low density foams (<20kg/m³) are found in the area of
 a. less than 40 parts of furan resin, plus
 b. more than 35 parts of furfuryl alcohol.

A borderline, representing 40 parts of furan resin, can be drawn separating foams with densities below and above 40 kg/m³.

Table N

| Foam No. | UFF resin, parts | Furan resin, parts | Furfuryl-alcohol, parts | Density, kg/m³ |
|---|---|---|---|---|
| 1 | 10 | 80 | 10 | 105 |
| 2 | 10 | 70 | 20 | 76 |
| 3 | 10 | 50 | 40 | 58 |
| 4 | 15 | 60 | 25 | 50 |
| 5 | 20 | 70 | 10 | 82 |
| 6 | 20 | 50 | 30 | 56 |
| 7 | 25 | 60 | 15 | 44 |
| 8 | 25 | 35 | 40 | 17 |
| 9 | 30 | 50 | 20 | 47 |
| 10 | 35 | 35 | 30 | 35 |
| 11 | 40 | 50 | 10 | 45 |
| 12 | 40 | 20 | 40 | 16 |
| 13 | 50 | 20 | 30 | 24 |
| 14 | 55 | 5 | 40 | 21 |
| 15 | 65 | 5 | 30 | 25 |
| 16 | 80 | 10 | 10 | 34 |
| 17 | 65 | 30 | 5 | 32 |

Example XXXVI

Two foams were prepared, using

| | |
|---|---|
| UFF resin, prepared according to Example XIII | 60 g |
| furan resin, prepared according to Example XII | 40 g |
| silicone surfactant | 1 g |
| n-hexane | 3 g |
| filler | x g |
| H₃PO₄:H₂SO₄:1,4 butanediol (4:2:4,5) | 12.5 g |

In both foams dextrose monohydrate was used as a filler.

| In foam a: x equals: 10 g dextrose | | |
|---|---|---|
| in foam b: x equals: 40 g dextrose | | |
| foam properties: | foam a | foam b |
| density | 25.4 kg/m³ | 92.1 kg/m³ |
| 10% compressive strength | 62 kN/m² | 338 kN/m² |
| critical oxygen index (astm d 2863-70) | 31 | 38 |

The end point in the oxygen index test was a short flash over possibly due to volatiles not removed by the conditioning prior to test.

We claim:

1. A synthetic furfuryl alcohol polymer foam having a density of at least about 20 kg/m³ and substantially no exotherm at 200°C. comprising:

1. 100 parts by weight of the polymerization product, at least 50 parts by weight of which are derived from furfuryl alcohol, of (a) 10 to 75 parts by weight of a furfuryl alcohol resin, (b) 10 to 80 parts by weight of a urea-formaldehydefurfuryl alcohol resin in a molar ratio range of 1:1 to 10:0.5 to 12:0.5, and (c) the remainer being free furfuryl alcohol, polymerized in the presence of a strong acid catalyst and a blowing agent; and
 2. up to 100 parts by weight of filler.

2. A synthetic foam according to claim 1 wherein the molar ratio of formaldehyde to urea is between 1:1 and 6:1.

3. A synthetic foam according to claim 1 wherein said filler is capable of chemically reacting with said polymer.

4. A synthetic foam according to claim 3 wherein said filler is a material containing hydroxyl and/or carbonyl groups.

5. A synthetic foam according to claim 4 wherein said filler is a lignin containing material.

6. A synthetic foam according to claim 5 wherein said filler is lignin sulphonate.

7. A synthetic foam according to claim 1 wherein said strong acid catalyst is selected from the group consisting of phosphoric acid and a mixture of phosphoric acid and sulphuric acid.

8. A process for preparing a synthetic furfuryl alcohol polymer foam having a density of at least about 20 kg/m³ and substantially no exotherm at 200°C. comprising polymerizing in the presence of a strong acid catalyst and a blowing agent a feed mixture of
 A. free furfuryl alcohol,
 B. 10 to 75 parts by weight of a furfuryl alcohol resin, and
 C. 10 to 80 parts by weight of a urea-formaldehydefurfuryl alcohol resin in a molar ratio of 1:1 to 10:0.5 to 12:0.5, said free furfuryl alcohol being present in an amount sufficient to give a total feed mixture of 100 parts by weight, to produce as a polymerization product said synthetic furfuryl alcohol polymer foam at least 50 parts by weight of which are derived from furfuryl alcohol, based on 100 parts by weight of the polymerization product.

9. A process according to claim 8 wherein the ratio of formaldehyde to urea is 1:1 to 6:1.

10. A process according to claim 8 further including incorporating into said polymer a filler reactive with at least one of components (A), (B), and (C).

11. A process according to claim 10 wherein said filler contains hydroxyl or carbonyl groups.

12. A process according to claim 11 wherein said filler is lignin.

13. A process according to claim 12 wherein said filler is lignin sulphonate.

14. A process according to claim 8 characterized in that said urea-formaldehyde furfuryl alcohol resin has a urea to formaldehyde molar ratio from about 1:1 to 1:10 and a urea to furfuryl alcohol molar ratio of at least 1:1.

15. A synthetic foam according to claim 8 wherein said strong acid catalyst is selected from the group consisting of phosphoric acid and a mixture of phosphoric acid and sulphuric acid.

* * * * *